(12) United States Patent
Roeder et al.

(10) Patent No.: US 6,439,763 B2
(45) Date of Patent: *Aug. 27, 2002

(54) VARIABLE MICROWAVE COLD/WARM NOISE SOURCE

(75) Inventors: Robert S. Roeder, Dunedin; Matthew C. Smith, Largo; Lawrence P. Dunleavy, Land of Lakes; Steven M. Lardizabal, Tampa, all of FL (US)

(73) Assignee: Raytheon Company, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/780,754

(22) Filed: Feb. 8, 2001

Related U.S. Application Data

(62) Division of application No. 09/319,520, filed as application No. PCT/US97/20969 on Nov. 28, 1997, now Pat. No. 6,217,210.
(60) Provisional application No. 60/032,262, filed on Dec. 3, 1996.

(51) Int. Cl.[7] .......................... G01K 7/30; G01K 15/00; G01S 3/02
(52) U.S. Cl. .......................... 374/1; 374/175; 342/351; 342/174
(58) Field of Search ...................... 374/1, 175; 342/351, 342/174

(56) References Cited

U.S. PATENT DOCUMENTS

| 3,409,827 A | 11/1968 | Goggings, Jr. ............. 324/58.5 |
| 3,525,037 A | 8/1970 | Madden et al. ................. 324/7 |
| 3,564,420 A | 2/1971 | Webb ......................... 325/363 |
| 3,628,151 A | 12/1971 | Roeder ....................... 325/363 |
| 3,693,095 A | 9/1972 | Wilt ........................... 325/363 |
| 3,777,270 A | 12/1973 | Hardy et al. ................. 325/363 |

(List continued on next page.)

FOREIGN PATENT DOCUMENTS

| EP | 0 523 221 A | 1/1993 | ........... G01R/29/08 |

OTHER PUBLICATIONS

Leber, et al., "Improved Microwave Radiometery for Remote Sensing", Proceedings of the 8th European Microwave Conference, Paris, Franc, 1978, pp. 25–28.

(List continued on next page.)

*Primary Examiner*—Diego Gutierrez
*Assistant Examiner*—Lydia M. De Jesús
(74) *Attorney, Agent, or Firm*—Baker Botts L.L.P.

(57) ABSTRACT

A radiometer calibrating system utilizes an adjustable noise source for calibrating a radiometer. The noise source includes a transistor configured as a noise equivalent circuit having a gate port, drain port and source port. A source inductance providing series feedback for the noise source has one end coupled to the source port of the noise equivalent circuit and another end connected to the ground. A bias circuit controls the amount of DC bias applied to the noise equivalent circuit. In order to match the impedances in the noise source, an output impedance matching network is connected to the drain port and an input impedance matching network is connected to the gate port of the noise equivalent circuit. The output and input impedance networks have an output port and input port, respectively. Included in the noise source is a port switch that terminates a matched load to the output port when a cold thermal radiation temperature is generated at the input port, and alternatively, the port switch terminates the matched load to the input port when the warm thermal radiation temperature is generated at the output port.

8 Claims, 7 Drawing Sheets

U.S. PATENT DOCUMENTS

| | | | |
|---|---|---|---|
| 4,272,731 A | | 6/1981 | Day et al. .................. 331/78 |
| 4,568,200 A | | 2/1986 | Hatono et al. ............. 374/122 |
| 5,128,884 A | | 7/1992 | Prager ........................ 364/571 |
| 5,176,146 A | | 1/1993 | Chive et al. ............... 600/549 |
| 5,231,404 A | * | 7/1993 | Gasiewski .................. 342/351 |
| 5,270,528 A | | 12/1993 | Ogikubo ..................... 250/201 |
| 5,341,814 A | | 8/1994 | Van De Velde et al. ... 128/736 |
| 5,354,325 A | | 10/1994 | Chive et al. ............... 607/101 |
| 5,688,050 A | | 11/1997 | Sterzer et al. ............. 374/122 |
| 5,909,963 A | * | 6/1999 | Weiss et al. ............... 374/175 |
| 5,949,845 A | | 9/1999 | Sterzer ........................ 378/37 |
| 6,137,440 A | * | 10/2000 | Roeder et al. ............. 342/351 |

OTHER PUBLICATIONS

Dicke, R.H., "The Measurement of Thermal Radiation at Microwave Frequencies", The Review of Scientific Institute, 1946, vol. 17, No. 7, pp. 268–275.

Robert H. Frater and David R. Williams, "An Active 'Cold' Noise Source", 1981 IEEE, pp. 344–347.

David R. Williams, "Calibration of C–Band 3.7–4.2GHz, Hot–Cold Head S/N101", Berkshire Technologies, Inc., May 15, 1988.

Winson, et al., "A Table–Based Bias and Temperature–Dependent Small–Signal and Noise Equivalent Circuit Model," *IEEE*, vol. 45, No. 1, Jan. 1997.

Blundell, "The United Kingdom National Standard of Microwave Noise at 4.1 GHz and 77k,"*Journal of Physics for Scientific Instruments*, vol. 8, 1975.

PCT International Search Report dated Sep. 28, 1998 for Application No. PCT/US97/20969 filed Nov. 28, 1997.

Supplementary European Search Report dated Dec. 22, 1999 for Application No. EP 97 94 6480.

* cited by examiner

VARIABLE MICROWAVE COLD/WARM NOISE SOURCE

CROSS REFERENCE TO RELATED APPLICATIONS

This application is a divisional of U.S. application Ser. No. 09/319,520, filed Aug. 23, 1999 is now U.S. Pat. No. 6,217,210, by Robert S. Roeder, et al and entitled "VARIABLE COLD/WARM NOISE SOURCE", which is a 371 of PCT/US97/20969 filed Nov. 28, 1997, which claims priority to U.S. Provisional Application No. 60/032,262 filed Dec. 3, 1996.

TECHNICAL FIELD OF THE INVENTION

The present invention relates to calibration of a radiometer with reference temperatures from a noise source and, more particularly, to calibration of a radiometer with reference temperatures from an electronically adjustable noise source providing hot thermal radiation temperature from an output port and cold thermal radiation temperature from an input port.

BACKGROUND OF THE INVENTION

Radiometers are used to measure thermal radiation or brightness temperatures emitted from a segment of a remote object. The segment is commonly referred to as a scene and may be a portion of the earth's surface. Like most sophisticated instrumentation, radiometers require periodic calibration to insure accurate measurements. In practice, at least two known calibration temperatures that abound the brightness temperatures of the scene are used to calibrate a radiometer receiver. The lowest and highest calibration temperatures are referred to as cold and hot thermal radiation temperatures, respectively.

Radiometers are generally ground-based, airborne or satellite-based systems that measure brightness temperatures in the mostly cold range of 10° K–300° K. There are also specialized radiometer applications where an instrument is needed to measure hot brightness temperatures from forest fires and burning dumps. For these applications the radiometer must measure brightness temperatures in the range of 300° K to greater than 1000° K. The ground-based systems may utilize closed cycle refrigeration such as a sterling cycle cooler with liquid nitrogen or is liquid helium to generate cold thermal radiation temperatures "Tc". The closed cycle refrigeration systems are not considered practical for the satellite-based systems.

Referring to FIGS. 1–3, there are illustrated three traditional satellite-based systems for measuring the brightness temperature "Ta" emitted from a portion of the earth's surface and received by an antenna 36. The brightness temperature "Ta" is then transmitted through an antenna feed 32 on an antenna-earth scene line 12 to a radiometer receiver 16 of the radiometer 150. Currently, satellite-based systems use calibration techniques that are either externally-based (FIGS. 1 and 2) or internally-based (FIG. 3).

Referring to FIG. 1, there is illustrated an externally-based calibration technique known as the sky horn approach. The sky horn approach utilizes a radiometer 150 which includes a first RF switch 10 connected to either the antenna-earth scene line 12 or a calibration line 14 to the radiometer receiver 16. In the calibration line 14 a second RF switch 18 alternately switches between a sky horn 20 and in internal warm load 22. The sky horn 20 outputs the cold space thermal radiation temperature "Tc," approximately 2.7° K, and the internal warm load "Tw," approximately 300° K. A precision thermistor 24 in thermal contact with the warm load 22 outputs an electrical hot thermal radiation temperature "Td" that is equivalent to the hot thermal radiation temperature "Tw." The electrical hot thermal radiation temperature "Td" is utilized in the calibration of the radiometer receiver 16.

The sky horn approach is a complex and expensive way to calibrate the radiometer receiver 16. The main problem is that the antenna-earth scene line 12 and calibration line 14 are separate lines, thereby requiring precise knowledge of the RF losses, mismatch losses and physical temperatures of each line to accurately calibrate the radiometer receiver 16. Also, the use of the sky horn 20 adds to the complexity of the calibration, because of possible interference of the sky horn pattern by a spacecraft or contamination caused by the earth or sun.

Referring to FIG. 2, there is illustrated another externally-based calibration technique for satellite-based systems using an antenna scanner 26. The antenna scanner 26 is a mechanical mechanism employed during a calibration mode to alternately couple a reflector plate 28 or an absorption target 30 to respectively feed a cold thermal radiation temperature "Tc" or a warm thermal radiation temperature "Tw" to the antenna feed 32. The antenna feed 32 is connected to the radiometer receiver 16. During an antenna mode when the brightness temperature "Ta" is measured the antenna scanner 26 connects the antenna-earth scene line 12 to the radiometer receiver 16. The antenna scanner 26 does have an advantage over the sky horn approach in that only one RF path is utilized. However, the antenna scanner 26 is complex, bulky and adds significant size and weight to the radiometer 150.

Referring to FIG. 3, there is illustrated an internally-based calibration technique that may be used in a satellite-based system. The internal approach is very similar to the sky horn approach discussed previously and illustrated in FIG. 1. However, the internal technique may utilize a thermoelectric cooler 34 to generate a cold thermal radiation temperature "Tc" of approximately 270° K, instead of the sky horn 20 used in the sky horn approach. However, the warm and cold thermal radiation temperatures "Tc" and "Tw" used in the internal is approach may only be 30° K apart. The 30° K difference between the cold and warm thermal radiation temperatures "Tc" and "Tw" does not cover the full range of each brightness temperatures which are approximately 100° K to 300° K, (exclusive of burning materials) therefore, measurement accuracy of the radiometer receiver 16 will likely degrade below the cold thermal radiation temperature "Tc."

Accordingly, there is a need for an adjustable calibration noise source to provide cold to hot thermal radiation temperatures from a waveguide or coaxial port. There is also a need to provide a noise source manufactured using microwave integrated circuit (MIC) and/or monolithic microwave integrated circuit (MMIC) technologies. These and other needs are satisfied by the adjustable calibration noise source of the present invention.

SUMMARY OF THE INVENTION

The present invention is a radiometer calibration system utilizing an electronically adjustable noise source and a method for calibrating a radiometer. The noise source includes a transistor configured as a noise equivalent circuit having a gate port, drain port and source port. A source inductance providing series feedback for the noise source has one end coupled to the source port of the noise equivalent circuit and another end connected to ground. A bias circuit controls the amount of DC bias applied to the noise equivalent model. In order to match the impedances in the noise source, an output impedance matching network is connected to the drain port and an input impedance matching network is connected to the gate port of the noise equivalent model. The output and input impedance networks have an output port and input port, respectively. The noise source terminates a matched load to the output port while an adjustable cold thermal radiation temperature is generated at the input port. Alteratively, a port switch may be used to terminate a matched load to the input port while an adjustable hot thermal radiation temperature is generated at the output port.

According to the present invention there is provided an adjustable noise source for calibrating ground-based, airborne, or satellite-based radiometers.

Also in accordance with the present invention there is provided a noise source that functions in the millimeter and microwave spectrum.

Further in accordance with the present invention there is provided a noise source implemented as an integrated circuit.

Further in accordance with the present invention there is provided a calibration system having a noise source for measuring the radiometer receiver transfer function or receiver linearity.

Further in accordance with the present invention there is provided a calibration system having a noise source with a built-in-test capability providing noise figure measurements.

In accordance with the present invention there is also provided a radiometer having adjustable calibration time intervals to maximize the measurement of earth scenes.

BRIEF DESCRIPTION OF THE DRAWINGS

A more complete understanding of the invention may be had by reference to the following Detailed Description when taken in conjunction with the accompanying Drawings wherein.

DETAILED DESCRIPTION OF THE INVENTION

Figure 1:
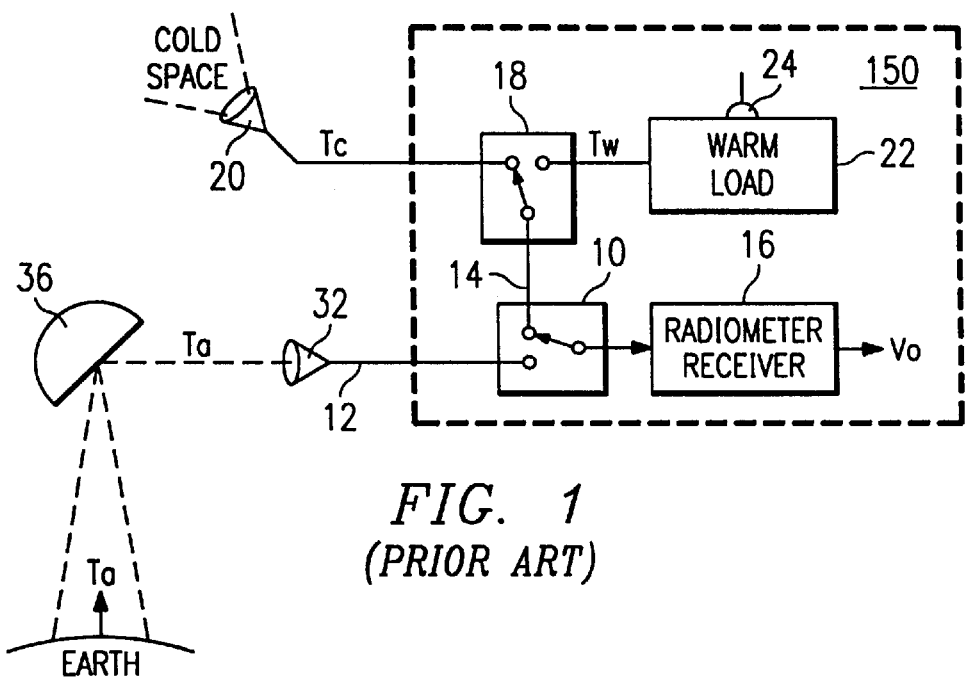
FIG. 1 is a schematic representation of PRIOR ART illustrating a sky horn approach for calibrating a satellite-based radiometer.
Figure 2:
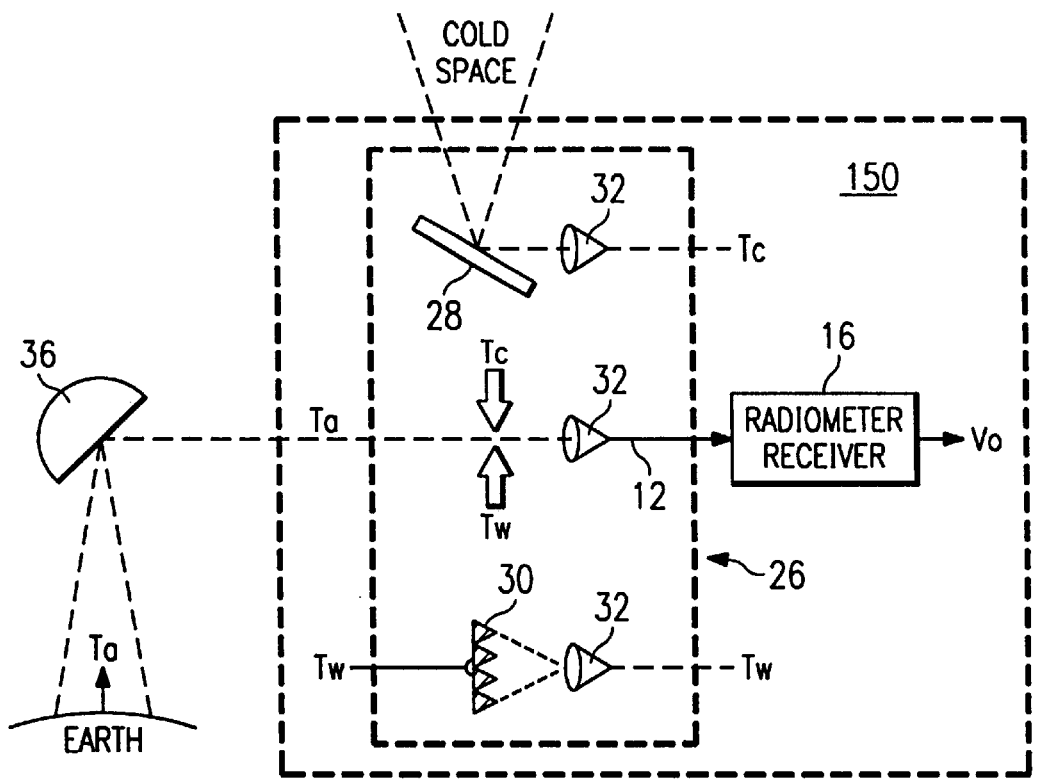
FIG. 2 is a schematic representation of PRIOR ART illustrating a calibration technique using an antenna scanner.
Figure 3:
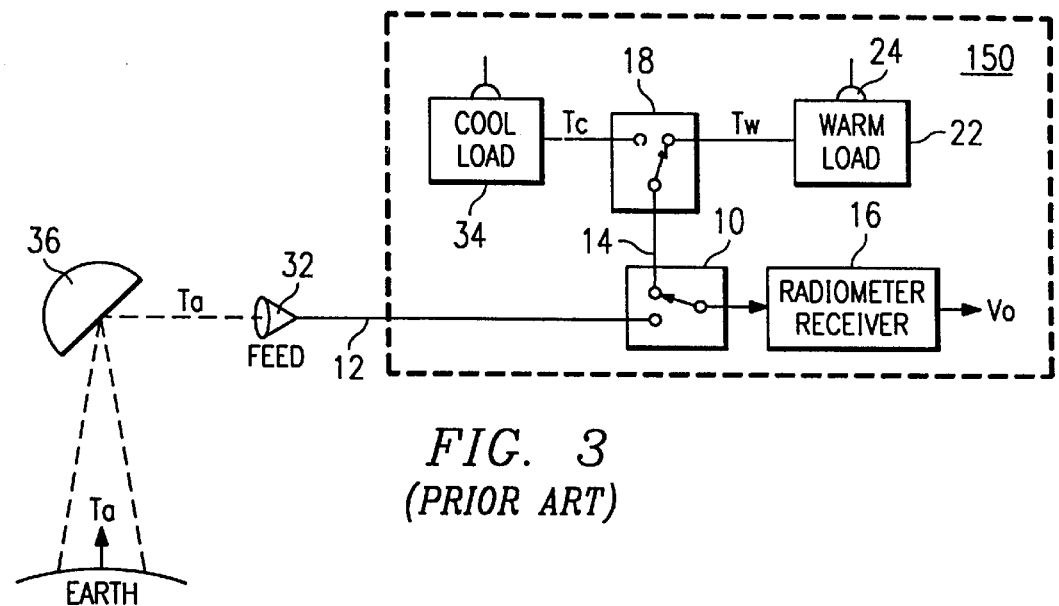
FIG. 3 is a schematic representation of PRIOR ART where an internally-based calibration technique uses a thermoelectric cooler.
Figure 4:
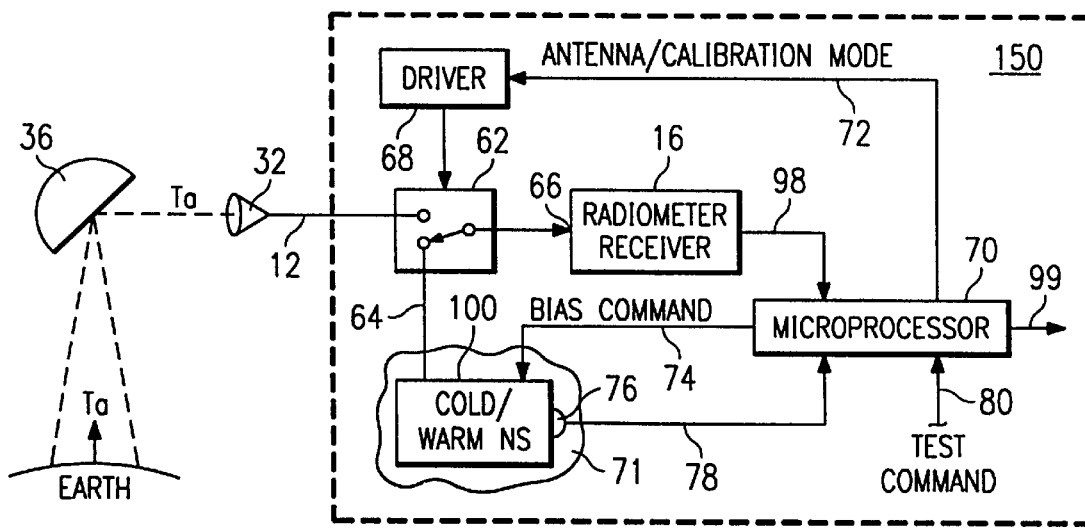
FIG. 4 is a schematic representation of the present invention illustrating a satellite-based radiometer calibration system incorporating an adjustable noise source.

Referring to FIG. 4, wherein like numerals represent like parts throughout the several views, there is disclosed an adjustable noise source 100 for calibration of a radiometer in accordance with the present invention.

Although the noise source 100 will be described incorporated with a radiometer calibration system 150, those skilled in the art will appreciate such application is only one of many for utilizing the noise source of the present invention. Accordingly, the described noise source 100 should not be construed in a limiting manner.

A noise source using a FET such as illustrated and described in U.S. application Ser. No. 09/319,520, now U.S. Pat. No. 6,217,210 B1, has warm and cold termal radiation temperatures output at the gate port of the FET. Robert Roeder and Matthew Smith, two of the inventors of the present invention, are joint inventors of the noise source illustrated and described in the U.S. application Ser. No. 09/319,520, U.S. Pat. No. 6,217,210 B1, which is hereby incorporated into this specification.

Major contributing errors associated with calibrating satellite-based radiometers arise from the following factors: (1) cold calibration brightness temperature; (2) warm calibration brightness temperature; (3) radiometer receiver transfer function; (4) ground retrieval algorithm; and (5) antenna brightness temperature. Each of the major contributing errors must be separately addressed and combined in establishing an overall accuracy scheme for the radiometer calibration system 150. The errors associated with the cold and warm calibration brightness temperatures and the radiometer receiver transfer function are addressed by the noise source 100. A detailed description of the noise source 100 will be discussed after describing the Interaction of the noise source with the radiometer calibration system 150.

Referring to FIG. 4, there is illustrated a block diagram of the satellite-based radiometer calibration system 150 incorporating the noise source 100. The brightness temperature "Ta" emitted from a segment of the earth's surface is received by the antenna reflector 36 and transmitted to the antenna feed 32. The antenna feed 32 outputs the brightness temperatures "Ta" on the antenna-earth scene line 12. The antenna-earth scene line 12 is connected to a selector switch 62 for switching either the antenna-earth scene line 12 or a calibration line 64 to an input terminal 66 of the radiometer receiver 16. The calibration line 64 connects the noise source 100 to the radiometer receiver 16. The selector switch 62 is preferably a low loss RF ferrite switch.

A driver 68 actuates and controls the selector switch 62 according to commands received from a microprocessor 70. Initially, the microprocessor 70 receives a "test command" signal from an external source (not shown) on line 80; the test command triggers the calibration sequence.

Figure 6A:
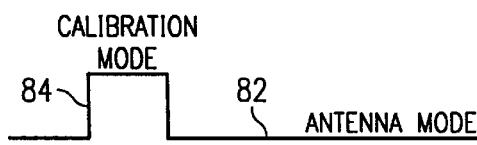
FIGS. 6A, 6B and 6C are illustrations of calibration and port switch commands respectively transmitted by a microprocessor to a drive and the adjustable noise source illustrated in FIG. 7.
Figure 6B:
Figure 6B:
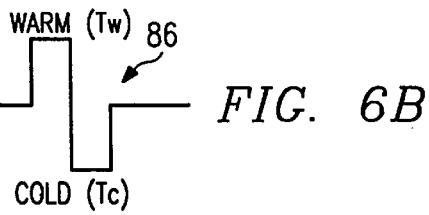

Referring to FIGS. 4, 6A, 6B and 6C, the microprocessor 70 transmits a command on line 72 to the driver 68 to actuate either an antenna mode 82 or calibration mode 84 (FIG. 6A). In the antenna mode 82 the selector switch 62 is actuated to connect the antenna-earth scene line 12 to the input terminal 66 of the radiometer receiver 16. In the calibration Mode 84 the selector switch 62 is actuated to connect the calibration line 64 to the input terminal 66 of the radiometer receiver 16. Selection of the calibration mode at selected time intervals for short durations maximizes measurements of the brightness temperatures "Ta".

Figure 6C:
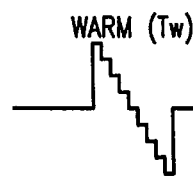
Figure 6C:
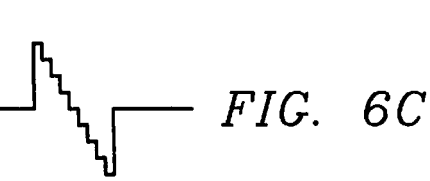

The microprocessor 70 also transmits a port switch command signal 86 (FIG. 6B) on line 74 to the noise source 100. The noise source 100, in response to the port switch command signal 86, alternately outputs a fixed cold thermal radiation temperature "Tc" or a fixed warm thermal radiation temperature "Tw". The temperature may be stepped from warm to cold as shown in FIG. 6C. The stepped mode is used to measure the radiometer receiver transfer function. Alternating between the warm and cold thermal radiation temperatures "Tc", "Tw" occurs during the calibration mode 84. The noise source 100 does not output the cold thermal radiation temperature "Tc" or the warm thermal radiation temperature "Tw" during the antenna mode 82.

Referring again to FIG. 4, the noise source 100 includes a correction precision thermistor 76 in thermal contact with the noise source and connected to the microprocessor 70 by a line 78. The correction precision thermistor 76 provides compensation for changes in the physical temperature "Td" of the noise source 100. A thermal insulation blanket 71 may be provided to encompass the noise source 100. The compensation, DC bias, and the correction precision thermistor 76 will be discussed in greater detail later.

Prior to using the radiometer calibration system 150, the noise source 100 is initially calibrated with a laboratory radiometer (not shown). During the initial calibration of the radiometer calibration system 150 there is generated a series of reference calibration curves which are stored in the microprocessor 70. the calibration curves are accessed by the microprocessor 70 during the calibration mode 84 to adjust the uncorrected output voltage from the radiometer receiver 16 on line 98 to output a corrected output voltage on line 99.

Referring to FIGS. 5A, 5B, 5C and 5D, the calibration curves include a precision thermistor calibration curve 88, a noise source radiation temperature drift curve 90, a radiometer calibration curve 92 and a corrected radiometer calibration curve 94. The calibration curves illustrate the calibration procedure based on using the two known calibration temperatures "Tc" and "Tw".

The precision thermistor curve 88 (FIG. 5A) illustrates the change in the voltage "Vd" versus the physical temperature "Td" of the noise source 100 sensed by the thermistor 76 and applied to the microprocessor 70along the signal line 78. "Vd" is a calibrated thermistor output voltage corresponding to the known physical temperature "Td."

Figure 5A:
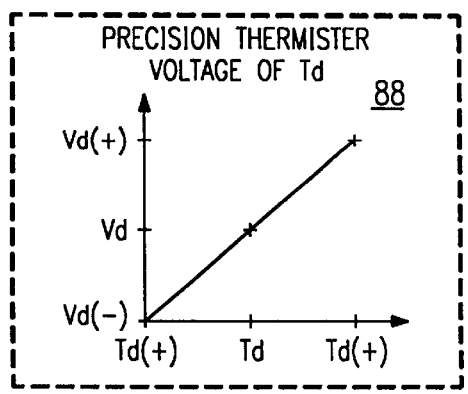
FIGS. 5A–5D are illustrations of calibration curves for use with the radiometer calibration system of FIG. 4.
Figure 5B:
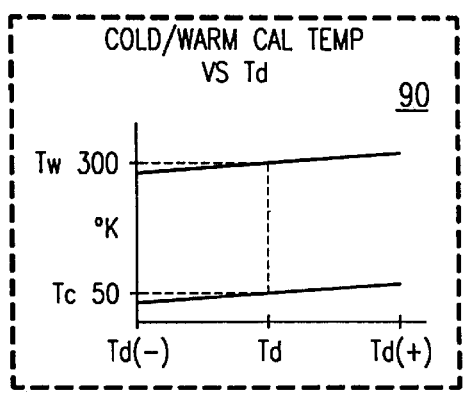
Figure 5C:
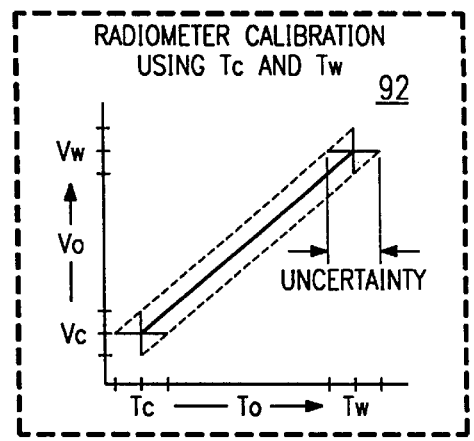
Figure 5D:
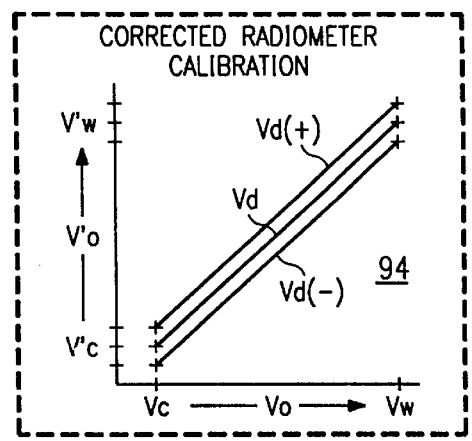

The noise source radiation temperature drift curve 90 (FIG. 5B) on the line 64 and radiometer calibration curve 92 (FIG. 5C) on the line 98 are combined into the corrected radiometer calibration curve 94 (FIG. 5D). The corrected radiometer calibration curve 94 represents the amount of correction required of the uncorrected output voltage generated by the radiometer receiver 16 on line 98 and input to the microprocessor 70. The radiometer calibration curve 92 (FIG. 5C) illustrates the radiometer calibration performance during the calibration mode 84. The uncertainty is due to the variation in the physical temperature "Td" of the noise source 100. The microprocessor 70 utilizing data represented by the precision thermistor curve 88 adjusts the uncorrected voltage output on line 98 to generate a corrected voltage on line 99. The corrected voltage output represents the correct output by taking into consideration the physical temperature "Td" of the noise source 100. The shift in the calibration curves 88, 90, 92 and 94 have been exaggerated to illustrate the correction procedures of the radiometer calibration system 150. Furthermore, data represented by the calibration curves 88, 90, 92 and 94 is also utilized to adjust the output signal of the radiometer receiver 16 when operating in the antenna mode 82.

Figure 7:
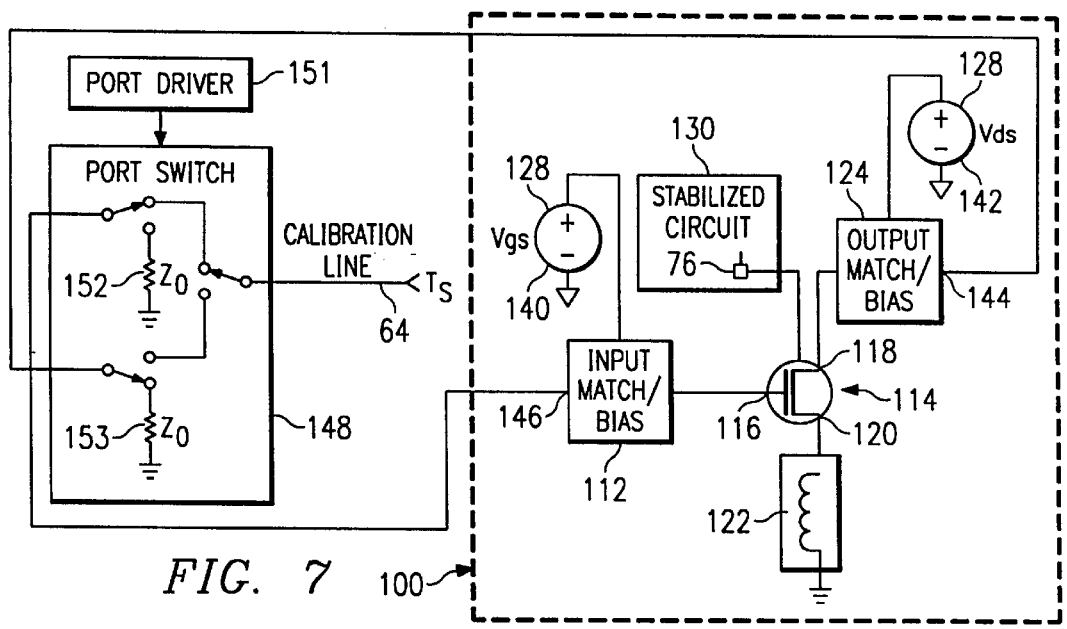
FIG. 7 is a schematic of the adjustable noise source.

Referring to FIG. 7, there is illustrated a schematic of the adjustable noise source 100. The noise source 100 includes a field 5 effect transistor (FET) configured as a noise equivalent model 114 and having a gate port 116, a drain port 118 and a source port 120. The noise equivalent model 114 is a microwave active circuit designed to generate noise temperatures such as warm and cold thermal radiation temperatures "Tw" and "Tc" when DC bias is applied.

The term "noise-temperature" is an expression for the noise power spectral density at a specified f frequency and is derived from Planck's blackbody formula. The average energy of an oscillator at a temperature T is:

$$\langle \epsilon \rangle = \frac{hf}{\exp(hf/kT) - 1} \quad (1)$$

where f is the frequency; his Planck's constant; and k is the thermal conductivity. At high temperatures and low frequencies $\langle \epsilon \rangle$ approaches kT so the power in a bandwidth B will be P=kTB (Nyquist's formula). A quantity $\phi$=P/kB is taken as a convenient unit of thermal noise power spectral density and is referred to as "noise temperature." The noise source 100 includes a source inductance 122 with one end coupled to the source port 120 of the noise equivalent model 114 and another end connected to ground. The source inductance 122 provides series feedback for the noise 100, where the source inductance 122 is typically in the range of 20–700 pH.

A bias circuit 128 generates the DC bias that is applied to the noise source 100, during the calibration mode 84. The bias circuit 128 generates the voltage "Vgs" 140 (voltage across the gate port 116 and the source port 120) and the voltage "Vds" 142 (voltage across the drain port 118 and the source port 120). The microprocessor 70 adjusts the magnitude of the DC bias to change the values of the cold and hot thermal radiation temperatures "Tc" and "Tw". More particularly, the DC bias corresponds to the port switch command signal on line 74 transmitted from the microprocessor 70 (FIG. 4).

A stabilizing compensation circuit 130 in contact with the noise equivalent model 114 and connected to the microprocessor 70 (FIG. 4) provides further control of the DC bias. The stabilizing circuit 130 includes the precision thermistor 76 and measure the physical temperature "Td" of the noise source 100. When the stabilizing compensation circuit 130 is not used fluctuations in the physical temperature "Td" of the noise source 100 may adversely effect the performance of the noise source.

An output matching impedance network 124 includes an output port 144 from which the warm thermal radiation temperature "Tw" is outputted. The output matching impedance network 124 further includes a plurality of output transmission lines and/or lumped elements (FIG. 8) configured and sized to match the impedances of the output port 144 and the drain port 118 of the noise equivalent circuit 114. The output matching network 124 has one end connected to the drain Port 118. The plurality of output transmission lines and/or lumped elements may be manufactured on an $Al_2O_3$ substrate of approximately 0.015" thick for frequencies up to about 35 GHZ.

An input matching impedance network 112 includes an input port 146 from which the cold thermal radiation temperature "Tc" is outputted. The input matching network 112 further includes a plurality of input transmission lines and/or lumped elements (FIG. 8) configured and sized to match the impedances of the input port 146 and the gate port 116 of the noise equivalent circuit 114. The input matching impedance network 112 has one end connected to the gate port 116 of the noise equivalent model 114. The plurality of input transmission lines and/or lumped elements may be manufactured on an $Al_2O_3$ substrate approximately 0.015" thick.

A port driver 151 actuates and controls a port switch 148 according to a port switch command received from the microprocessor 70. The port driver 151 preferably configured with low loss RF ferrite switches. The port switch 148 has a plurality of contracts connecting output port 144 and input port 146, to the calibration line 64 (FIG. 4).

The port switch 148 selects either the cold thermal radiation temperature "Tc" or the hot thermal radiation temperature "Tw." The contacts of the port switch 148 are configured in a predetermined manner such that a matched load 152 terminates the input port 146 when the calibration line 64 connects to the output port 144, or a matched load 153 terminates the output port 144 when the calibration line 64 connects to the input port 146.

The hot thermal radiation temperature "Tw" exits the output port 144 when the matched load 152 terminates the input port 146, and a cold thermal radiation temperature "Tc" exits the input port 146 when the matched load 153 terminates the output port 144. The two matched loads 152 and 153 have one end connected to the ground and the other end connected to either the output port 144 or the input port 146. The typical noise temperatures generated by the noise source 100 have a range of less than 100° K to 2600° K.

Figure 8:
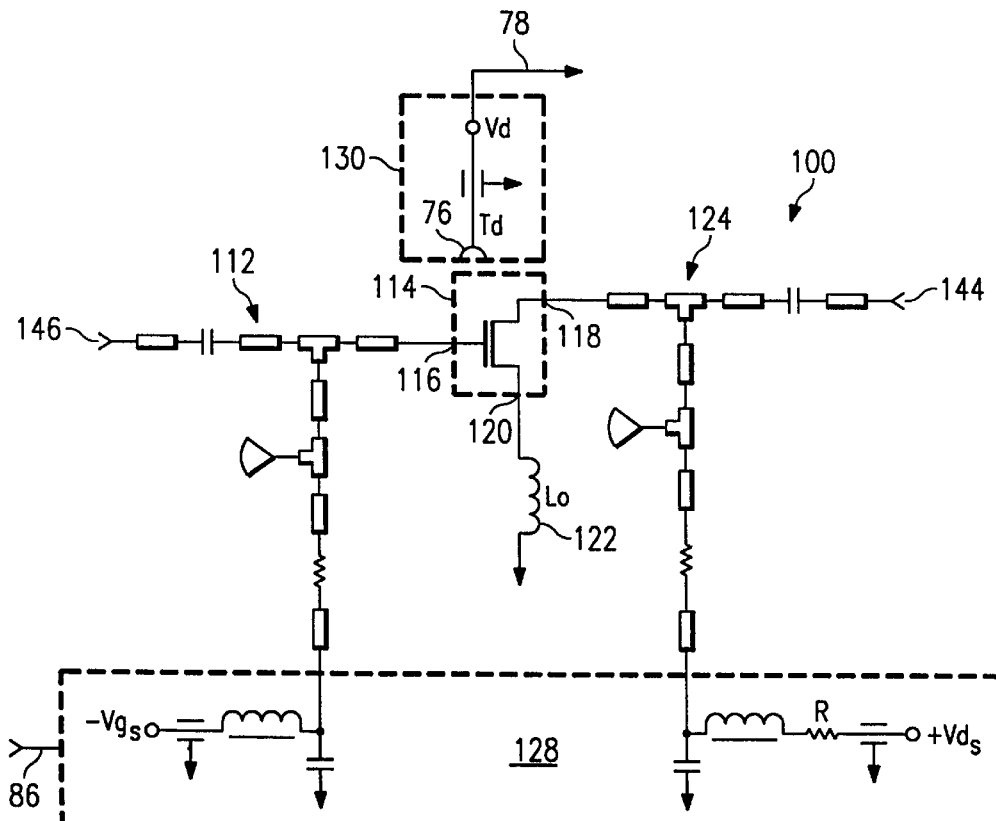
FIG. 8 is a schematic of the adjustable noise source (without a port switch, port driver and load) implemented as a microwave integrated circuit.

Referring to FIG. 8, there is illustrated a schematic of an adjustable noise source implemented as a microwave integrated circuit. The microwave integrated circuit utilizes either microwave integrated circuit (MIC) or monolithic microwave integrated circuit (MMIC) technologies. The noise source 100 may be designed to operate in the microwave and millimeter wave spectrum having an operation frequency of 2 GHz to 90 GHz.

Figure 9:
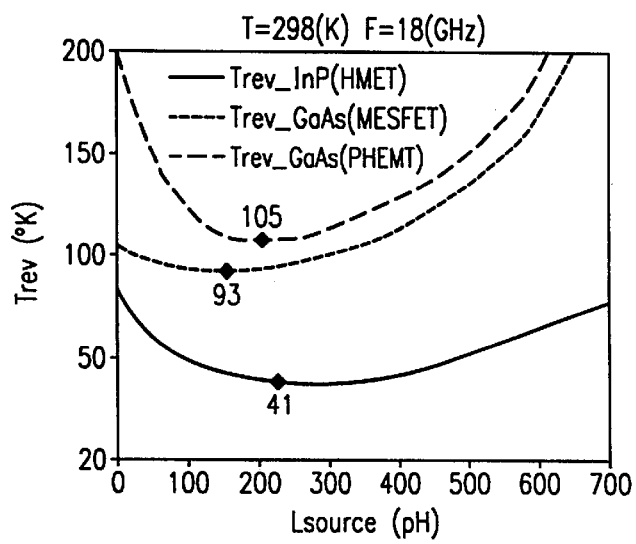
FIG. 9 is a graph indicating noise temperature performances for three types of FETS, each biased for a minimum-noise figure at 18 GHz.

Referring to FIG. 9, a series of graphs illustrate noise temperature performances for three types of FETs, each biased for minimum noise figure at 18 GHz. The FET types include a 0.25 $\mu$m GaAs MESFET, a 0.25 $\mu$m GaAs PHEMT and a 0.15 $\mu$m InP HEMT. The FETs were enabled by noise circuit models and implemented in HP-EESOF's Libra (TM). "Trev" represents noise power exiting the input port of a two-port terminated in a reflection-less load held at 0° K.

"Trev", also referred to as reverse available noise, may be used to predict a source temperature "Ts" (FIG. 7) which is either the cold or warm thermal radiation temperature "Tc" and "Tw." The source temperature "Ts" is indicative of the cold or warm thermal radiation temperature "Tc" and "Tw" when the reverse available noise "Trev" is added to an ambient temperature noise of the opposite port termination transformed through the noise equivalent model 114 using the appropriate forward or reverse power gain. The source temperature "Ts" so calculated may be referred to as port 1 source temperature "Tout1" and port 2 source temperature "Tout2".

Figure 10:
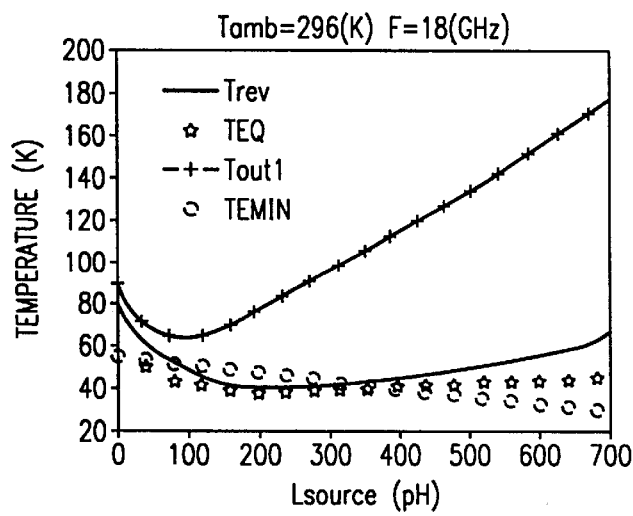
FIG. 10 is a graph comparing input noise temperatures output from an InP HEMT (FET) having various source inductances.

Referring to FIG. 10, there is illustrated a graph comparing input noise temperatures output from an InP HEMT (FET) having various source inductances 122. The graph also includes measurements for "Temin" the effective minimum noise temperature defined as Tcmin=To(Fmin−1). The graph also indicates "Teq" the equivalent noise temperature of the short circuit noise current in the input port 146 having a resistance of 50 $\Omega$.

Figure 11:
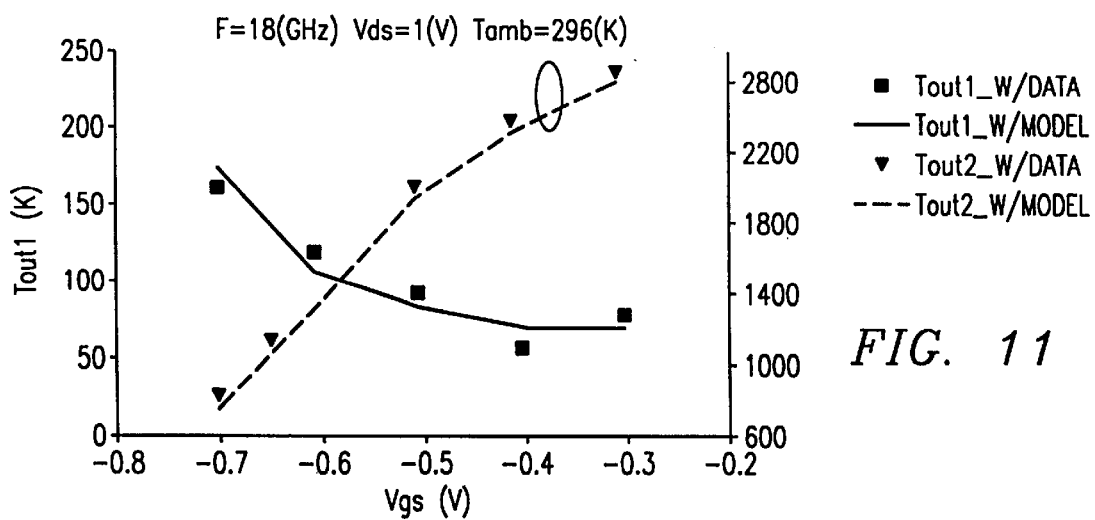
FIG. 11 is a graph of measured and simulated data illustrative of cold and hot thermal radiation temperatures output from the InP HEMT illustrated in FIG. 11.

FIG. 11 is a graph illustrative of measured and simulated data of cold "Tout1" and warm "Tout2" thermal radiation temperatures "Tc" and "Tw" output from the InP HEMT. In the graph the source temperature "Ts" is a function of the voltage "Vgs" 140 where "Vds" 142 equals one volt and source inductance 122 equals 0.24 nH.

Figure 12:
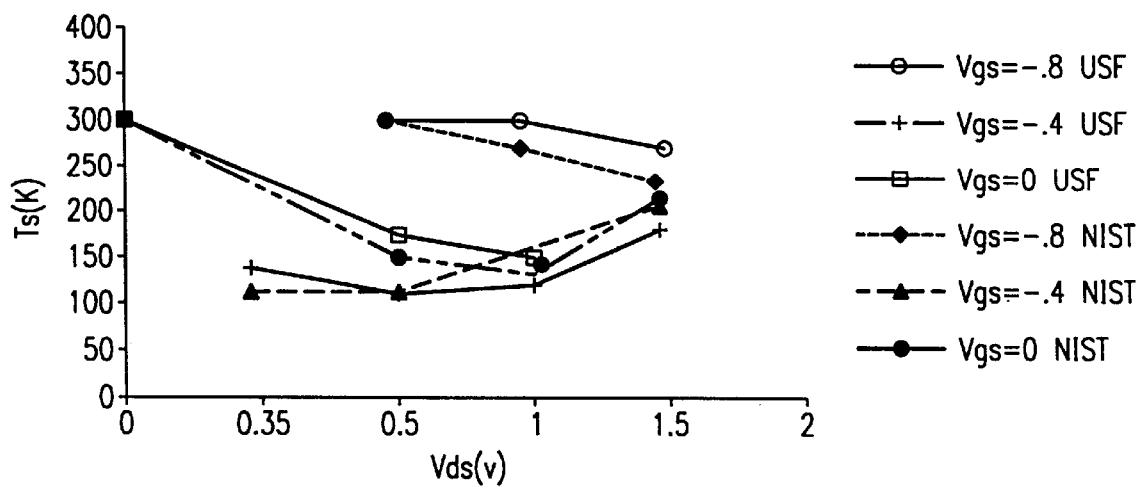
FIG. 12 is a graph of cold thermal radiation temperatures measured at the InP HEMT operating at 18 GHz.

FIG. 12 is a graph of cold thermal radiation temperatures "Tc" measured from the InP HEMT operating at 18 GHz. A portion of the measurements were made at the National Institute of Standards and Technology (NIST) using an 18–26 GHz substitution radiometer, referenced to a cryogenic waveguide noise standard. The remaining measurements were taken by using the noise power measurement mode of a 0.01–18 GHz HP8970B/HP8971B noise figure measurement system. The remaining measurements were referenced to a HP346B solid-state diode.

Figure 13:
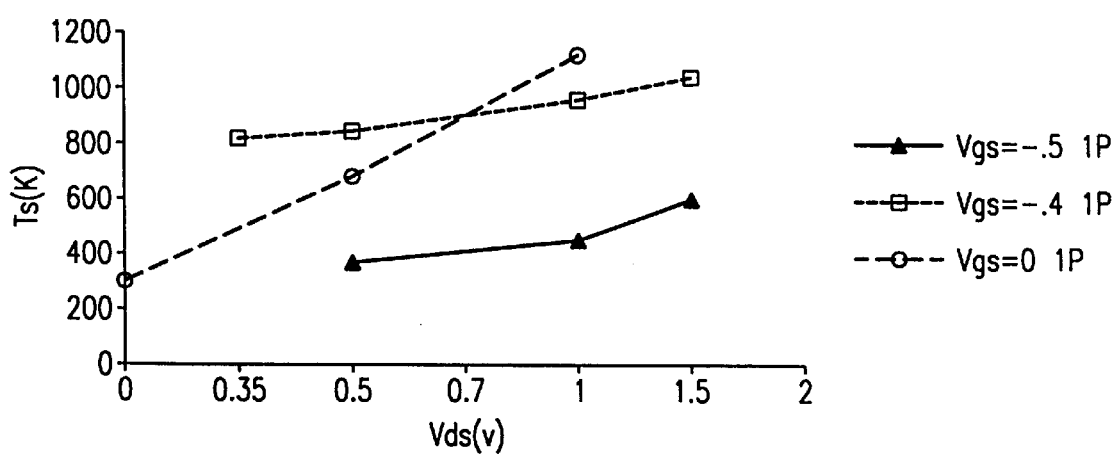
FIG. 13 is a graph of hot thermal radiation temperatures measured at the FET operating at 18 GHz.

FIG. 13 is a graph of warm thermal radiation temperatures measured at 18 GHz, from the output port with the input terminated in a 50 OM load.

Figure 14:
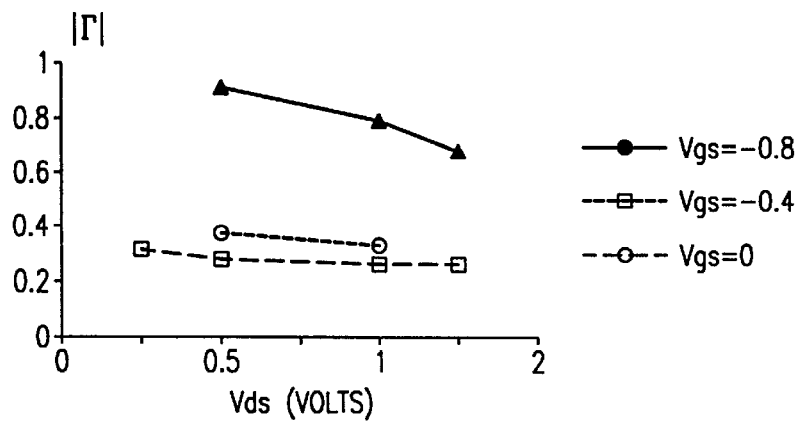
FIG. 14 is a graph illustrating a measured variation of cold noise source (port 1) reflecting coefficient magnitude at 18 GHz.

FIG. 14 is a graph illustrating a measured variation of cold noise source (port 1) reflection coefficient magnitude. The measured variation may necessitate the use of a circulator for some applications, and is responsible for some of the differences between the temperature data illustrated in FIG. 12. However, the reflection coefficient does show minimal variation with bias in the intended operation region.

Figure 15:
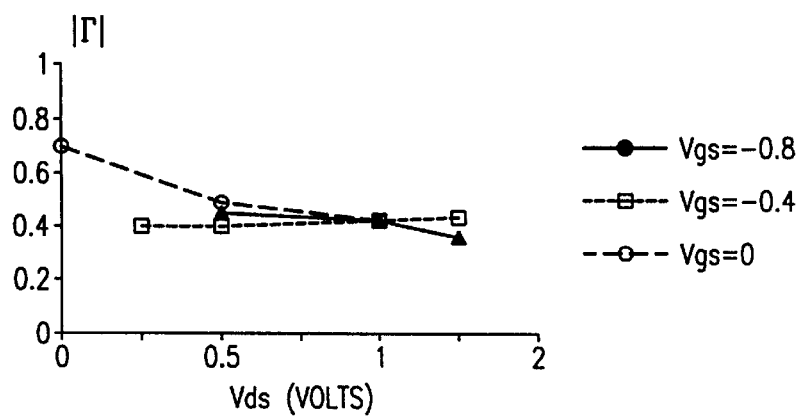
FIG. 15 is a graph illustrating a measured variation of warm noise source (port 2) reflecting magnitude at 18 GHz.

FIG. 15 is a graph illustrating a measured variation of hot noise source (port 2) reflection magnitude.

Figure 16:
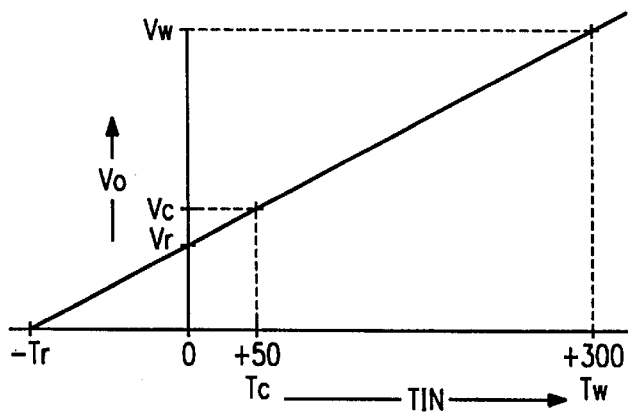
FIG. 16 is a graph illustrating a noise figure measurement of the radiometer receiver.

Referring to FIG. 16 there is a graph illustrating a noise figure measurement of the radiometer receiver 16. Noise figure measurement is the process of quantitatively determining the ratio of the total noise power per unit bandwidth at the output of the noise source 100 to the portion of the noise power due to the input termination, at the standard temperature of 290° K. The noise figure (F) equation may be represented by the following equation:

$$F = Tr/To + 1 \qquad (2)$$

where "Tr" is the receiver noise temperature and "To" represents the temperature of the radiometer receiver 16. "To" is measured using a receiver precision thermistor (not shown) mounted on RF components in the radiometer receiver 16.

The following equations are derived by referring to FIG. 7 and are relevant in calculating the noise figure measurement utilizing a linear radiometer receiver 16:

For the linear radiometer receiver $$\frac{Vo - Vc}{Tin - Tc} = \frac{Vw - Vc}{Tw - Tc} \quad (4)$$

Tin=Tc or Tw applied to the radiometer receiver

For Tin=0

$$VR = Vc = Tc\left[\frac{Vw - Vc}{Tw - Tc}\right]; \text{ and} \quad (5)$$

$$Tr = Vc\left[\frac{Tw - Tc}{Vw - Vc}\right] - Tc \quad (6)$$

The noise figure is expressed by:

$$F = Tr/To + 1 \text{ (where } To \approx 290° \text{ (ambient))} \quad (7)$$

where "Vc,", "Vr," and "Vw" are the radiometer output voltages corresponding to "Tc," "Tr" and "Tw," respectively.

While the present invention has been described with reference to the illustrated embodiment, it is not intended to cover such alternatives, modifications and equivalents as may be included in the spirit and scope of the invention as defined in the following claims.

What is claimed is:

1. A method for calibrating a radiometer receiver using an adjustable noise source, comprising:

transmitting a thermal radiation temperature adjustable bias command from a microprocessor to the noise source;

adjusting the value of a cold thermal radiation output from a first port of the adjustable noise source in response to the adjustable bias command;

adjusting the value of a warm thermal radiation temperature output from a second port of the adjustable noise source in response to the adjustable bias command;

coupling the cold thermal radiation temperature output or warm thermal radiation temperature output to the radiometer receiver; and alternating the position of a port switch in accordance with a command transmitted from the microprocessor to the noise source to alternate the coupling between the cold thermal radiation temperature output and the warm thermal radiation temperature output to the radiometer receiver.

2. The method in accordance with claim 1 further comprising stabilizing the voltage output from the radiometer receiver.

3. The method in accordance with claim 1 further comprising controlling the bias command applied to the noise source during calibration of the radiometer receiver.

4. The method in accordance with claim 1 further comprising compensating the noise source for changes in the physical temperature thereof.

5. The method in accordance with claim 1 further comprising:

storing in the microprocessor initial reference calibration curves; and adjusting the uncorrected output voltage of the radiometer receiver by accessing the calibration curves stored in the microprocessor.

6. The method in accordance with claim 5 wherein the noise source comprises a thermistor in thermal contact with the noise source, and wherein storing the calibration curves comprises:

storing a correction thermistor calibration curve;

storing a noise source radiation temperature drift curve; and storing a radiometer calibration curve.

7. The method in accordance with claim 1 further comprising operating the noise source at frequencies in the range from 2 GHz to 90 GHz.

8. The method in accordance with claim 1 wherein the cold thermal radiation temperature output and the warm thermal radiation temperature output encompass a range of 100° K to 2600° K.

* * * * *

UNITED STATES PATENT AND TRADEMARK OFFICE
CERTIFICATE OF CORRECTION

PATENT NO.   : 6,439,763 B1
DATED        : August 27, 2002
INVENTOR(S)  : Robert S. Roeder et al.

It is certified that error appears in the above-identified patent and that said Letters Patent is hereby corrected as shown below:

Column 4,
Line 36, after "cold", delete "termal" and insert -- thermal --.

Column 5,
Line 62, delete "70along" and insert -- 70 along --.

Column 7,
Line 46, after "have a range of", delete "less than".

Column 9,
Line 21, after "Vc," delete ",".
Line 24, after "embodiment, it is", delete "not".

Signed and Sealed this

Fourth Day of February, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,439,763 B1 | Page 1 of 1 |
| APPLICATION NO. | : 09/780754 | |
| DATED | : August 27, 2002 | |
| INVENTOR(S) | : Robert S. Roeder et al. | |

It is certified that error appears in the above-identified patent and that said Letters Patent is hereby corrected as shown below:

Title page, item [73] assignee: should read -- Raytheon Company and University of South Florida --.

Signed and Sealed this

Seventeenth Day of April, 2007

JON W. DUDAS
*Director of the United States Patent and Trademark Office*